United States Patent
Cho et al.

(10) Patent No.: US 9,966,637 B2
(45) Date of Patent: May 8, 2018

(54) BATTERY MODULE COMPRISING WIRE-FIXING RIBS

(71) Applicant: LG CHEM, LTD., Seoul (KR)

(72) Inventors: Yong Jun Cho, Daejeon (KR); Hyoung Chul Yoon, Daejeon (KR); Seog Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days. days.

(21) Appl. No.: 15/307,339

(22) PCT Filed: Jul. 5, 2016

(86) PCT No.: PCT/KR2016/007217
§ 371 (c)(1),
(2) Date: Oct. 27, 2016

(87) PCT Pub. No.: WO2017/014448
PCT Pub. Date: Jan. 26, 2017

(65) Prior Publication Data
US 2017/0179542 A1    Jun. 22, 2017

(30) Foreign Application Priority Data

Jul. 21, 2015 (KR) ........................ 10-2015-0102747

(51) Int. Cl.
 *H01M 2/10* (2006.01)
 *H01M 10/42* (2006.01)
 (Continued)

(52) U.S. Cl.
 CPC ......... *H01M 10/425* (2013.01); *H01M 2/105* (2013.01); *H01M 2/1077* (2013.01);
 (Continued)

(58) Field of Classification Search
None
See application file for complete search history.

(56) References Cited

U.S. PATENT DOCUMENTS

2002/0102457 A1* 8/2002 Oogami ............... B60L 3/0046
 429/159
2011/0059342 A1   3/2011 Lee et al.
(Continued)

FOREIGN PATENT DOCUMENTS

KR   10-2010-0109857 A   10/2010
KR       10-1186628 B1    9/2012
(Continued)

*Primary Examiner* — Jonathan Crepeau
(74) *Attorney, Agent, or Firm* — Birch, Stewart, Kolasch & Birch, LLP

(57) ABSTRACT

A battery module including wire-fixing ribs is disclosed. The battery module includes a battery cell stack constituted by a plurality of battery cells, the battery cell stack being configured such that the battery cells are stacked in the state in which the battery cells are adjacent to each other laterally, the battery cell stack being provided in one end thereof with a step part, a first module cover and a second module cover coupled to each other while covering electrode terminals provided on opposite sides of the battery cell stack, terminal plates for electrically connecting electrode terminals of the battery cells to each other, a battery management system (BMS) mounted in the step part of the battery cell stack for controlling the operation of the battery module, and voltage sensing wires arranged on the battery cell stack, each of the voltage sensing wires having one end connected to a corresponding one of voltage sensing terminals formed on portions of the terminal plates and the other end connected to the BMS.

21 Claims, 4 Drawing Sheets

(51) Int. Cl.
   *H01M 10/48*   (2006.01)
   *H01M 2/30*    (2006.01)
(52) U.S. Cl.
   CPC ........... *H01M 2/30* (2013.01); *H01M 10/482*
                  (2013.01); *H01M 2010/4271* (2013.01)

(56)                References Cited

U.S. PATENT DOCUMENTS

| 2013/0130071 | A1* | 5/2013  | Adachi   | H01M 10/482 |
|              |     |         |          | 429/53      |
| 2013/0337299 | A1* | 12/2013 | Sugawara | H01M 2/206  |
|              |     |         |          | 429/61      |
| 2016/0172654 | A1  | 6/2016  | Lee      |             |
| 2017/0069897 | A1* | 3/2017  | Lee      | H01M 2/206  |

FOREIGN PATENT DOCUMENTS

| KR | 10-2012-0124764 A | 11/2012 |
| KR | 10-2015-0022398 A | 3/2015  |
| KR | 10-2015-0076913 A | 7/2015  |

\* cited by examiner

[FIG. 1]
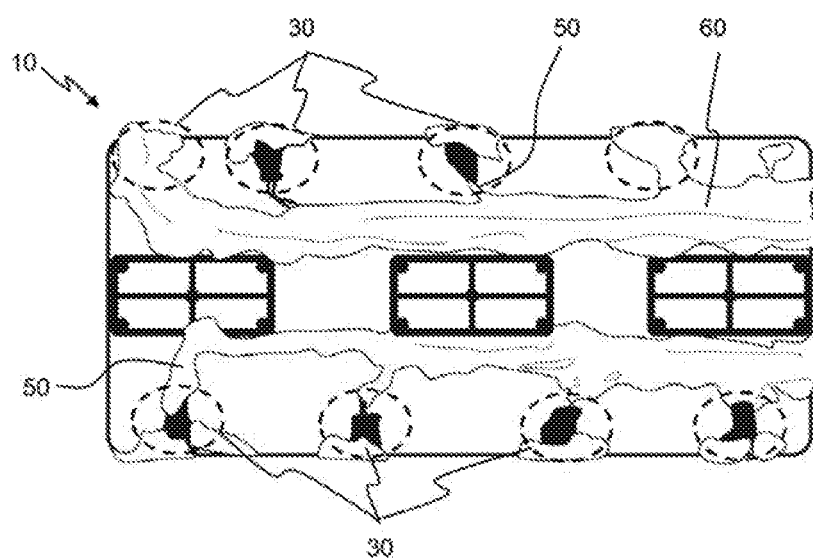
[FIG. 2]
100
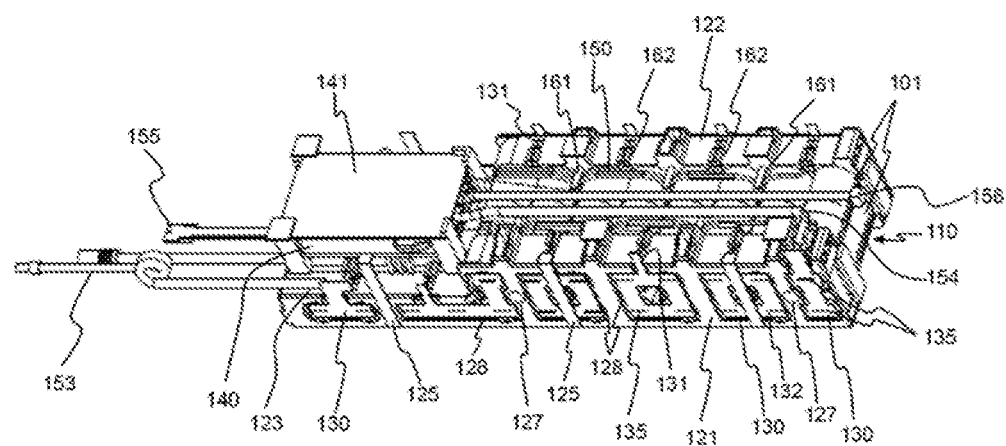

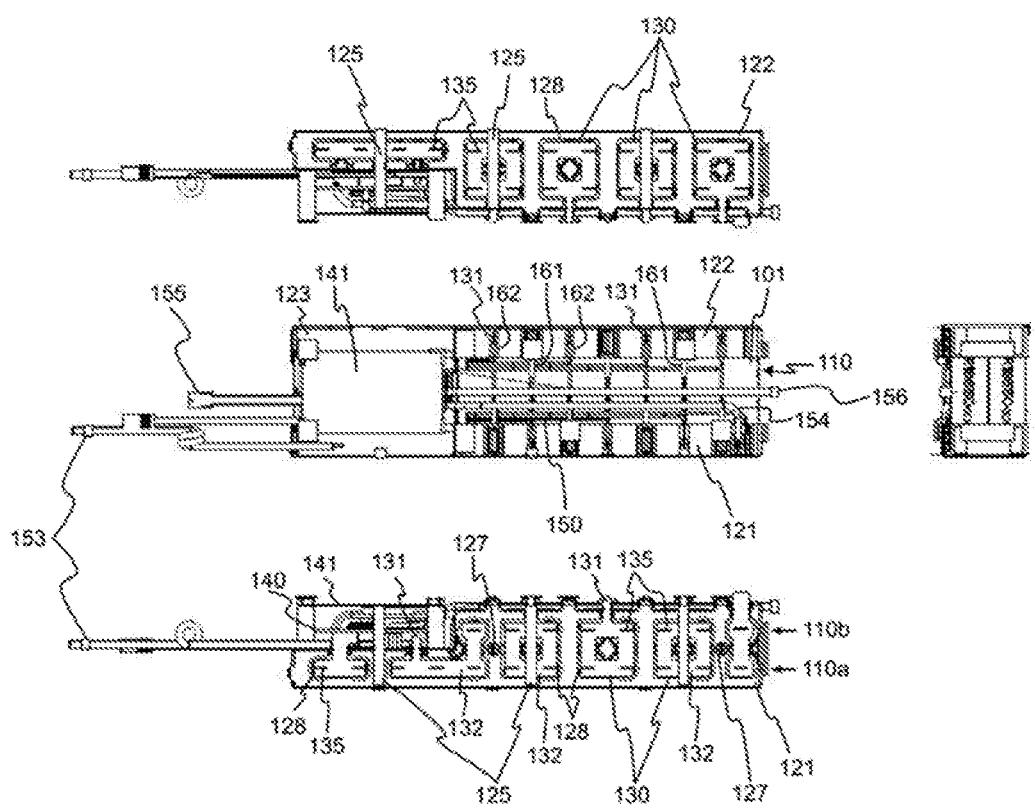
[FIG. 3]

[FIG. 4]
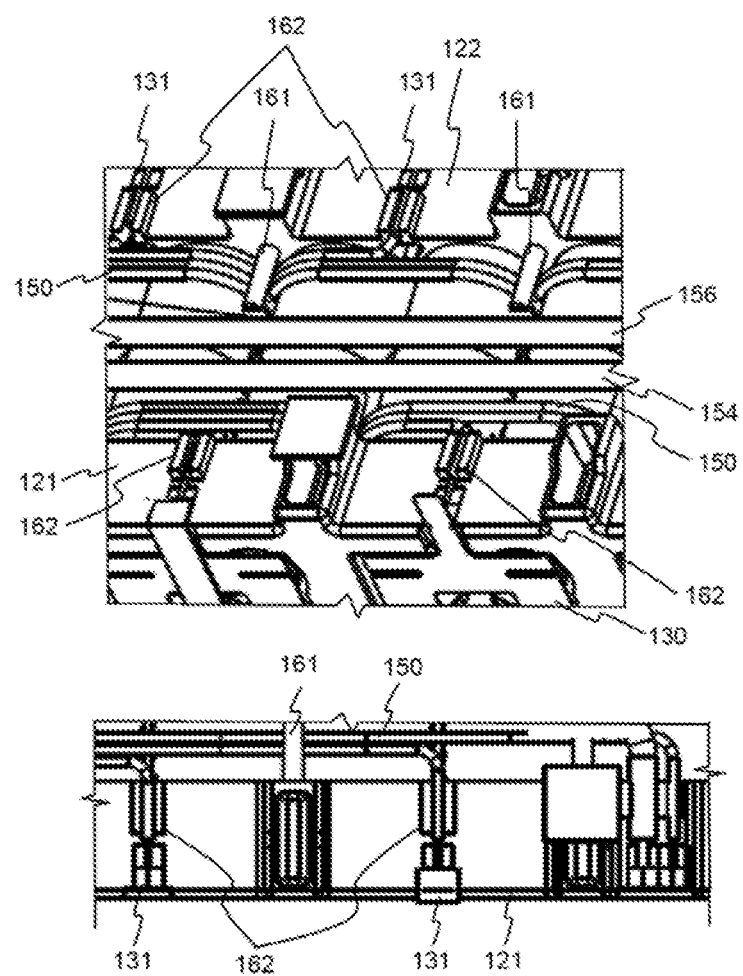

[FIG. 5]
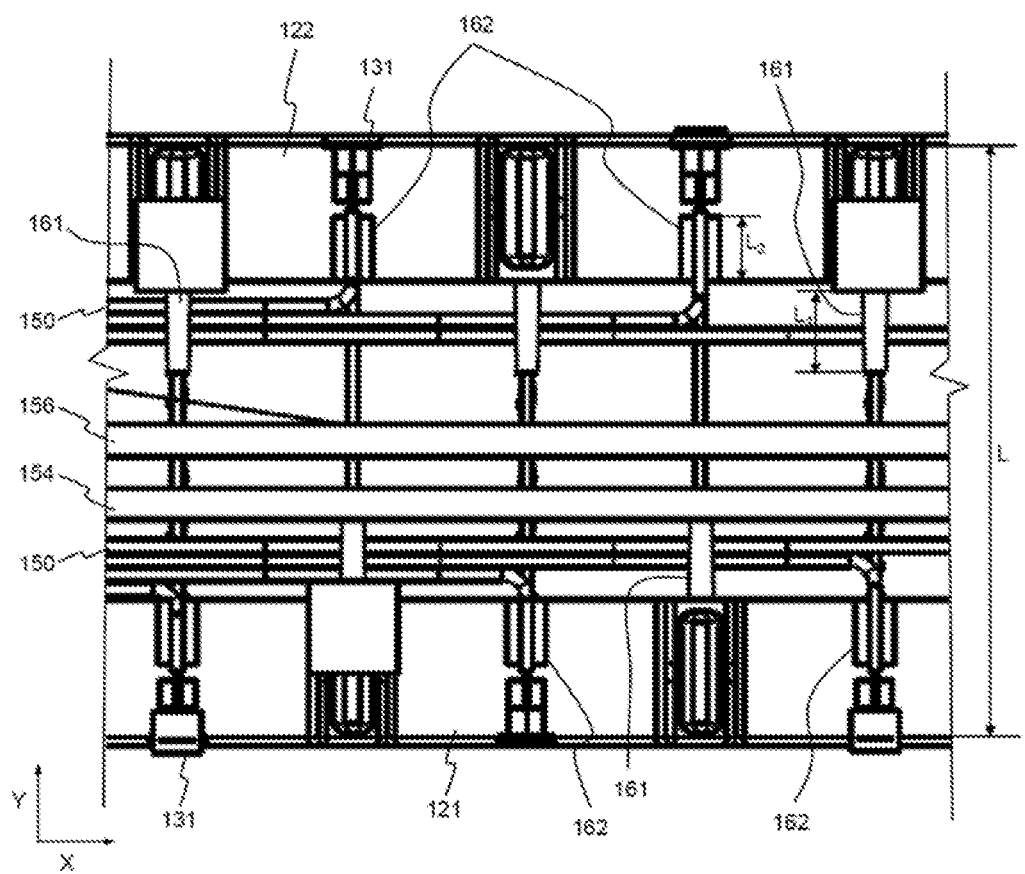

BATTERY MODULE COMPRISING WIRE-FIXING RIBS

CROSS-REFERENCE TO RELATED APPLICATIONS

This application claims the benefit of Korean Patent Application No. 10-2015-0102747 filed on Jul. 21, 2015 with the Korean Intellectual Property Office, the disclosure of which is herein incorporated by reference in its entirety.

TECHNICAL FIELD

The present invention relates to a battery module including wire-fixing ribs.

BACKGROUND ART

In recent years, a secondary battery, which can be repeatedly charged and discharged, has been widely used as an energy source for wireless mobile devices. In addition, the secondary battery has attracted considerable attention as an energy source for electric vehicles and hybrid electric vehicles, which have been developed to solve problems, such as air pollution, caused by existing gasoline and diesel vehicles that use fossil fuels. As a result, kinds of applications using the secondary battery are being increased owing to advantages of the secondary battery, and hereafter the secondary battery is expected to be applied to more applications and products than now.

Based on the construction of electrodes and an electrolyte, the secondary battery may be classified as a lithium ion battery, a lithium ion polymer battery, or a lithium polymer battery. In particular, the lithium ion polymer battery has been increasingly used because the lithium ion polymer battery has a low possibility of electrolyte leakage and can be easily manufactured.

Based on the shape of a battery case, the secondary battery may also be classified as a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet.

The secondary battery is being widely used as an energy source for diverse electronic products as well as various kinds of mobile devices. However, various kinds of combustible materials are contained in the secondary battery. As a result, the lithium secondary battery may overheat or explode due to the overcharge of the secondary battery, the overcurrent in the secondary battery, or other external physical impact applied to the secondary battery.

For this reason, the secondary battery is provided with a safety system, such as a protection circuit for interrupting electric current when the secondary battery is overcharged or overdischarged or when overcurrent flows in the secondary battery, a positive temperature coefficient (PTC) element whose resistance greatly increases so as to interrupt electric current when the temperature of the secondary battery increases, or a safety vent for interrupting electric current or exhausting gas when pressure increases due to generation of the gas. Meanwhile, a multi-cell type middle or large-sized battery pack, which is configured to have a multi-cell structure in which a plurality of battery modules is combined, is provided with a safety system, such as a fuse, a bimetal, or a battery management system (BMS), for protecting battery cells from overcharge, overdischarge, or overcurrent.

The safety system is connected to voltage sensing terminals via wires so as to detect voltages of battery cells or unit modules.

FIG. 1 is a typical view showing a conventional battery module in which an adhesive is used to fix voltage sensing wires.

Referring to FIG. 1, voltage sensing terminals 30 for voltage detection is formed on the upper surface of a battery module 10. Wires 50 are connected to the voltage sensing terminals 30. An adhesive 60 is applied so as to fix the wires 50, which extend from the middle to one side of the battery module.

In this structure, the voltage sensing terminals and the wires are soldered, and the adhesive is applied so as to fix the wires. Alternatively, the wires may be fixed using an adhesive tape.

In the case in which the wires are fixed using the adhesive or the tape, the aesthetic appearance of the battery module is greatly deteriorated, with the result that consumers' reliability and satisfaction are lowered.

In addition, the adhesive may not be applied uniformly or may not be applied to improper positions. In this case, the wires may not be fixed uniformly, whereby the wire may be separated when the manufacturing process is performed on a conveyor line.

Furthermore, material cost and manufacturing cost may be increased due to the use of the adhesive, and the manufacturing process is performed irregularly, with the result that tact time may be increased.

DISCLOSURE

Technical Problem

Therefore, the present invention has been made to solve the above problems and other technical problems that have yet to be resolved.

Specifically, it is an object of the present invention to provide a battery module configured such that ribs for fixing voltage sensing wires are alternately formed on the upper ends of module covers in order to solve various problems, such as the deterioration of the aesthetic appearance of the battery module, the increase in cost of manufacturing the battery module, and the non-uniformity in process of manufacturing the battery module, which may occur in the case in which an adhesive or an adhesive tape is used to fix the voltage sensing wires, which are connected to voltage sensing terminals, and to a battery management system (BMS) so as to protect secondary batteries.

Technical Solution

In accordance with one aspect of the present invention, the above and other objects can be accomplished by the provision of a battery module including a battery cell stack constituted by a plurality of battery cells, the battery cell stack being configured such that the battery cells are stacked in the state in which the battery cells are adjacent to each other laterally, the battery cell stack being provided in one end thereof with a step part, a first module cover and a second module cover coupled to each other while covering electrode terminals provided on opposite sides of the battery cell stack, terminal plates for electrically connecting electrode terminals of the battery cells to each other, a battery management system (BMS) mounted in the step part of the battery cell stack for controlling the operation of the battery module, and voltage sensing wires arranged on the battery cell stack, each of the voltage sensing wires having one end connected to a corresponding one of voltage sensing terminals formed on portions of the terminal plates and the other end connected to the BMS.

That is, in the battery module including the wire-fixing ribs according to the present invention, the voltage sensing wires are fixed without using an adhesive or an adhesive tape, thereby providing an aesthetically pleasing appearance to the battery module, preventing the increase of cost due to the use of the adhesive or the adhesive tape, and improving tact time through the simple and uniform manufacturing process of pushing the voltage sensing wires from above to fix the voltage sensing wires.

According to the present invention, each of the battery cells may be a cylindrical battery cell.

In a concrete example, the battery cell stack may be configured such that the number of battery cells arranged in the lower tier is greater than the number of battery cells arranged in the upper tier.

In this case, the step part may be located at one side of an upper end of the battery cell stack, and the battery module may have a hexahedral shape in the state in which the BMS is mounted in the step part.

In a concrete example, the first module cover and the second module cover may be configured to have a structure in which the battery cell stack is received in the first module cover and the second module cover.

In this structure, the first module cover and the second module cover may be provided at positions corresponding to the electrode terminals with holes corresponding to the shape of the terminal plates for electrically connecting the battery cells to each other.

In this case, a through channel, along which a coolant capable of cooling the battery cells may flow, may be defined in the first module cover and the second module cover.

The first module cover and the second module cover may be coupled to each other using a fastening member.

In addition, reinforcement members for increasing the coupling force between the first module cover and the second module cover may be mounted to the outsides of the first module cover and the second module cover. The reinforcement members may be configured to have a hook structure or may be configured so as to be elastic such that the coupling force between the first module cover and the second module cover is increased.

In a concrete example, ribs for fixing the voltage sensing wires are alternately formed on the upper ends of the first module cover and the second module cover.

In this case, the ribs may include first ribs formed to have a bar shape that protrudes in the direction in which the module covers are coupled to each other for fixing the voltage sensing wires in spaces defined between the battery cells and second ribs formed on the upper end surfaces of the module covers so as to have a groove shape corresponding to the outer diameter of the voltage sensing wires for allowing the voltage sensing wires to be fitted thereinto from above.

The first ribs may protrude from the inside ends of the module covers in the direction in which the module covers are coupled to each other.

According to circumstances, the first ribs may push the voltage sensing wires into the spaces defined between the battery cells, and may couple the voltage sensing wires into openings formed in the module covers.

In another case, the second ribs may be formed to have a shape that protrudes upward from the upper end surfaces of the module covers.

In this structure, the second ribs may have a groove that is concavely formed in protrusions protruding from the upper end surfaces of the module covers.

In a concrete example, each of the ribs may have a length equivalent to 5% to 30% of the length of each of the battery cells.

According to the present invention, the terminal plates may include two or more terminal plates having different structures for connecting the battery cells to each other.

According to circumstances, the terminal plates may be mounted to the outer surfaces of the first module cover and the second module cover in the state in which the terminal plates are connected to the electrode terminals of the battery cells.

In this case, the terminal plates may connect two or more battery cells to each other in series or in series and in parallel.

Each of the terminal plates may include a terminal connection part configured to contact a corresponding one of the electrode terminals of the battery cells, the terminal connection part being configured to have a rectangular shape, and a voltage sensing terminal extending from one side of each of the terminal plates toward upper surfaces of the module covers for sensing voltages of the battery cells.

According to circumstances, the terminal connection part may be provided at a portion thereof corresponding to a corresponding one of the electrode terminals of the battery cells with a slit for allowing terminal connection part to be welded to the electrode terminal of the battery cells.

In a concrete example, a separable BMS case for protecting the BMS from external impact or penetration of a needle-shaped member may be mounted above the BMS.

In accordance with another aspect of the present invention, there is provided a battery pack including the battery module.

In accordance with a further aspect of the present invention, there is provided a device including the battery pack.

The device may be any one selected from the group consisting of a computer, a mobile phone, a wearable electronic device, a wireless cleaner, a power tool, an unmanned aerial vehicle, an electric bicycle, an electric vehicle (EV), a hybrid electric vehicle, and a power storage apparatus.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a conventional battery module in which an adhesive is used to fix voltage sensing wires;

FIG. 2 is a typical view showing a battery module including wire-fixing ribs according to an embodiment of the present invention;

FIG. 3 is a typical view of the battery module including the wire-fixing ribs of FIG. 2; and FIGS. 4 and 5 are partially enlarged typical views showing the wire-fixing ribs of the battery module of FIG. 2.

BEST MODE

Now, exemplary embodiments of the present invention will be described in detail with reference to the accompanying drawings. It should be noted, however, that the scope of the present invention is not limited by the illustrated embodiments.

FIG. 2 is a typical view showing a battery module including wire-fixing ribs according to an embodiment of the present invention, and FIG. 3 is a typical view of the battery module including the wire-fixing ribs of FIG. 2.

Referring to FIGS. 2 and 3, a battery module 100 includes a battery cell stack 110 constituted by a plurality of battery cells 101, a first module cover 121 and a second module cover 122 coupled to each other for covering the battery cell stack 110, terminal plates 130 for connecting the battery cells 101 to each other, a battery management system (BMS) 140 for controlling the operation of the battery module 100, and voltage sensing wires 150 connected to voltage sensing terminals 131 and to the BMS 140.

The battery cell stack 110 is configured such that the battery cells 101 are stacked in the state in which the battery cells 101 are adjacent to each other laterally. The number of battery cells 101 arranged in the lower tier 110a is greater than the number of battery cells 101 arranged in the upper tier 110b such that the battery cell stack 110 is formed in a step shape. The step part 123 of the battery cell stack 110 is located at one side of the upper end of the battery cell stack 110.

The battery cell stack 110 is received in the first module cover 121 and the second module cover 122. The BMS 140 is mounted in the step part 123 of the battery cell stack 110. A separable BMS case 141 for protecting the BMS 140 from external impact or penetration of a needle-shaped member is mounted above the BMS 140.

In the case in which the BMS 140 is mounted in the step part 123 of the battery cell stack 110 so as to control the operation of the battery module 100 and the BMS case 141 is mounted to the BMS 140 so as to protect the BMS 140, the battery module 100 is configured to have a hexahedral shape.

One end of each of the voltage sensing wires 150 is connected to a corresponding one of the voltage sensing terminals 131, which are formed on the terminal plates 130. The other end of each of the voltage sensing wires 150 is connected to the BMS 140, which controls the operation of the battery module 100. The voltage sensing wires 150 are fixed by ribs 161 and 162.

Power cables 153 and 154 are connected to the BMS 140 so as to supply power to the BMS 140. A BMS lead 155 is connected to the BMS 140 so as to charge the BMS 140. In addition, an LED board connection line 156 is connected to the BMS 140. The LED board connection line 156 is connected to an external LED board so as to show information, such as a charging state.

The first module cover 121 and the second module cover 122 are coupled to each other using a fastening member 127. Reinforcement members 125 are mounted to the outsides of the first module cover 121 and the second module cover 122 so as to increase coupling force between the first module cover 121 and the second module cover 122.

The first module cover 121 and the second module cover 122 are provided at positions corresponding to electrode terminals of the battery cells with holes 128, corresponding to the shape of the terminal plates 130 for electrically connecting the battery cells 101 to each other in the state in which the battery cell stack 110 is received in the first module cover 121 and the second module cover 122.

A coolant flows through the holes 128 formed in the first module cover 121 and the second module cover 122 and through spaces between the respective battery cells 101 so as to cool the battery cells 101.

The terminal plates 130 are mounted to the outer surfaces of the first module cover 121 and the second module cover 122 such that the terminal plates 130 are exposed outward in the state in which the terminal plates 130 are connected to the electrode terminals of the battery cells 101.

The terminal plates 130 include two or more terminal plates 130 having different structures for connecting the battery cells 101 to each other. The terminal plates 130 electrically connect the electrode terminals of the battery cells 101 to each other. The terminal plates 130 connect two battery cells 101 or four battery cells 101 to each other in series or in series and in parallel.

Each of the terminal plates 130 includes a terminal connection part 132 and a voltage sensing terminal 131.

The terminal connection part 132 contacts a corresponding one of the electrode terminals of the battery cells 101 so as to electrically connect the battery cells 101 to each other. The voltage sensing terminal 131 extends from one side of each of the terminal plates 130 toward the upper surfaces of the module covers 121 and 122 so as to sense voltages of the battery cells 101. The voltage sensing terminals 131 are connected to the wires 150 by soldering.

Slits 135 for allowing the terminal connection parts 132 to be welded to the electrode terminals of the battery cell 101 are formed in the portions of the terminal connection parts 132 corresponding to the electrode terminals of the battery cells 101.

FIGS. 4 and 5 are partially enlarged typical views showing the wire-fixing ribs of the battery module of FIG. 2.

Referring to FIGS. 4 and 5, the ribs 161 and 162 include first ribs 161, each of which is configured to have a bar shape, and second ribs 162, each of which is configured to have a fitting structure.

The ribs 161 and 162 are alternately formed on the upper ends of the first module cover 121 and the second module cover 122 so as to fix the voltage sensing wires 150.

Each of the first ribs 161 is formed to have a bar shape that protrudes in the direction in which the module covers 121 and 122 are coupled to each other (i.e. in the Y-axis direction) so as to fix the voltage sensing wires 150 in spaces defined between the battery cells 101. Each of the first ribs 161 protrudes from the inside ends of the module covers 121 and 122 in the direction in which the module covers 121 and 122 are coupled to each other (i.e. in the Y-axis direction).

Each of the second ribs 162 is formed to have a shape that protrudes upward from the upper end surfaces of the module covers 121 and 122. Each of the second ribs 162 has a groove that is concavely formed in the protrusion.

The second ribs 162 are formed on the upper end surfaces of the module covers 121 and 122 such that the groove of each of the second ribs 162 corresponds to the outer diameter of a corresponding one of the voltage sensing wires 150. Consequently, the voltage sensing wires 150 are fitted into the second ribs 162 from above, and are connected to the voltage sensing terminals 131.

The length $L_1$ of each of the first ribs 161 is 15% of the length L of each of the battery cells, and the length $L_2$ of each of the second ribs 162 is 10% of the length L of each of the battery cells.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module including wire-fixing ribs according to the present invention has an aesthetically pleasing appearance as compared with a conventional battery module in which wires are fixed using an adhesive or an adhesive tape. Consequently, the present invention has the effect of improving consumers' reliability and satisfaction.

In addition, no adhesive is used. Consequently, the present invention has the effect of reducing material cost and manufacturing cost.

Furthermore, wires are fixed without using an adhesive. Consequently, the present invention has the effect of preventing the wire from being separated when the manufacturing process is performed on a conveyor line and improving tact time.

The invention claimed is:

1. A battery module comprising:
a battery cell stack constituted by a plurality of battery cells, the battery cell stack being configured such that the battery cells are stacked in a state in which the battery cells are adjacent to each other laterally, the battery cell stack being provided in one end thereof with a step part;
a first module cover and a second module cover coupled to each other while covering electrode terminals provided on opposite sides of the battery cell stack;
terminal plates for electrically connecting electrode terminals of the battery cells to each other;
a battery management system (BMS) mounted in the step part of the battery cell stack for controlling an operation of the battery module; and
voltage sensing wires arranged on the battery cell stack, each of the voltage sensing wires having one end connected to a corresponding one of voltage sensing terminals formed on portions of the terminal plates and the other end connected to the BMS,
wherein reinforcement members for increasing coupling force between the first module cover and the second module cover are mounted to outsides of the first module cover and the second module cover so as to extend outside and between the first module cover and the second module cover.

2. The battery module according to claim 1, wherein each of the battery cells is a cylindrical battery cell.

3. The battery module according to claim 1, wherein the battery cell stack is configured such that a number of battery cells arranged in a lower tier is greater than a number of battery cells arranged in an upper tier.

4. The battery module according to claim 1, wherein the step part is located at one side of an upper end of the battery cell stack, and the battery module has a hexahedral shape in a state in which the BMS is mounted in the step part.

5. The battery module according to claim 1, wherein the first module cover and the second module cover are configured to have a structure in which the battery cell stack is received in the first module cover and the second module cover, and the first module cover and the second module cover are provided at positions corresponding to the electrode terminals with holes corresponding to a shape of the terminal plates for electrically connecting the battery cells to each other.

6. The battery module according to claim 1, wherein the first module cover and the second module cover are coupled to each other using a fastening member.

7. The battery module according to claim 1, wherein ribs for fixing the voltage sensing wires are alternately formed on upper ends of the first module cover and the second module cover.

8. The battery module according to claim 7, wherein the ribs comprise:
first ribs formed to have a bar shape that protrudes in a direction in which the module covers are coupled to each other for fixing the voltage sensing wires in spaces defined between the battery cells; and
second ribs formed on upper end surfaces of the module covers so as to have a groove shape corresponding to an outer diameter of the voltage sensing wires for allowing the voltage sensing wires to be fitted thereinto from above.

9. The battery module according to claim 8, wherein the first ribs protrude from inside ends of the module covers in the direction in which the module covers are coupled to each other.

10. The battery module according to claim 8, wherein the first ribs push the voltage sensing wires into the spaces defined between the battery cells and couple the voltage sensing wires into openings formed in the module covers.

11. The battery module according to claim 8, wherein the second ribs are formed to have a shape that protrudes upward from the upper end surfaces of the module covers.

12. The battery module according to claim 8, wherein the second ribs have a groove that is concavely formed in protrusions protruding from the upper end surfaces of the module covers.

13. The battery module according to claim 8, wherein each of the ribs has a length equivalent to 5% to 30% of a length of each of the battery cells.

14. The battery module according to claim 1, wherein the terminal plates comprise two or more terminal plates having different structures for connecting the battery cells to each other.

15. The battery module according to claim 1, wherein the terminal plates are mounted to outer surfaces of the first module cover and the second module cover in a state in which the terminal plates are connected to the electrode terminals of the battery cells, and the terminal plates connect two or more battery cells to each other in series or in series and in parallel.

16. The battery module according to claim 15, wherein each of the terminal plates comprises:
a terminal connection part configured to contact a corresponding one of the electrode terminals of the battery cells, the terminal connection part being configured to have a rectangular shape; and
a voltage sensing terminal extending from one side of each of the terminal plates toward upper surfaces of the module covers for sensing voltages of the battery cells.

17. The battery module according to claim 16, wherein the terminal connection part is provided at a portion thereof corresponding to a corresponding one of the electrode terminals of the battery cells with a slit for allowing terminal connection part to be welded to the electrode terminal of the battery cells.

18. The battery module according to claim 1, wherein a separable BMS case for protecting the BMS from external impact or penetration of a needle-shaped member is mounted above the BMS.

19. A battery pack comprising a battery module according to claim 1.

20. A device comprising a battery pack according to claim 19.

21. A battery module comprising:
a battery cell stack constituted by a plurality of battery cells, the battery cell stack being configured such that the battery cells are stacked in a state in which the battery cells are adjacent to each other laterally, the battery cell stack being provided in one end thereof with a step part;
a first module cover and a second module cover coupled to each other while covering electrode terminals provided on opposite sides of the battery cell stack;
terminal plates for electrically connecting electrode terminals of the battery cells to each other;
a battery management system (BMS) mounted in the step part of the battery cell stack for controlling an operation of the battery module; and
voltage sensing wires arranged on the battery cell stack, each of the voltage sensing wires having one end connected to a corresponding one of voltage sensing terminals formed on portions of the terminal plates and the other end connected to the BMS,
wherein ribs for fixing the voltage sensing wires are alternately formed on upper ends of the first module cover and the second module cover, and
wherein the ribs comprise:
first ribs formed to have a bar shape that protrudes in a direction in which the module covers are coupled to each other for fixing the voltage sensing wires in spaces defined between the battery cells; and
second ribs formed on upper end surfaces of the module covers so as to have a groove shape corresponding to an outer diameter of the voltage sensing wires for allowing the voltage sensing wires to be fitted thereinto from above.

* * * * *